(12) United States Patent
Barral et al.

(10) Patent No.: US 9,581,714 B2
(45) Date of Patent: Feb. 28, 2017

(54) SYSTEM AND METHOD FOR SEISMIC STREAMER CONTROL

(71) Applicant: WESTERNGECO L.L.C., Houston, TX (US)

(72) Inventors: Nicolas Barral, Oslo (NO); Halvor S. Grønaas, Oslo (NO); Antonin Bertin, Saint Germain en Laye (FR)

(73) Assignee: WesternGeco L.L.C., Houston, TX (US)

( * ) Notice: Subject to any disclaimer, the term of this patent is extended or adjusted under 35 U.S.C. 154(b) by 262 days.

(21) Appl. No.: 14/288,597

(22) Filed: May 28, 2014

(65) Prior Publication Data

US 2014/0355380 A1    Dec. 4, 2014

Related U.S. Application Data

(60) Provisional application No. 61/828,345, filed on May 29, 2013.

(51) Int. Cl.
*G01V 1/38* (2006.01)

(52) U.S. Cl.
CPC .......... *G01V 1/3817* (2013.01); *G01V 1/3808* (2013.01); *G01V 1/3826* (2013.01)

(58) Field of Classification Search
CPC ............................ G01V 1/3808; G01V 1/3826
USPC ..................................................... 367/15–18
See application file for complete search history.

(56) References Cited

U.S. PATENT DOCUMENTS

| 5,668,775 | A | 9/1997 | Hatteland |
| 7,080,607 | B2 | 7/2006 | Hillesund et al. |
| 7,156,035 | B2 | 1/2007 | Hocquet et al. |
| 7,469,652 | B2 * | 12/2008 | Kristiansen ........... B63B 21/663 114/244 |
| 8,260,555 | B2 | 9/2012 | Welker |
| 2008/0279042 | A1 | 11/2008 | Storteig et al. |
| 2009/0147619 | A1 | 6/2009 | Welker |
| 2009/0238035 | A1 | 9/2009 | Hillesund et al. |
| 2010/0118645 | A1 | 5/2010 | Welker |
| 2011/0286302 | A1 | 11/2011 | Welker et al. |
| 2012/0082001 | A1 | 4/2012 | Welker et al. |
| 2012/0113745 | A1 | 5/2012 | Eick et al. |

(Continued)

FOREIGN PATENT DOCUMENTS

WO    2012036563    3/2012

OTHER PUBLICATIONS

Anonymous, "Norway: Ulmatec Introduces New Baro DefCon System," Subsea World News, Oct. 2011: pp. 1-2, <http://subseaworldnews.com/2011/10/05/norway-ulmatec-introduces-new-baro-defcon-system/>.

(Continued)

*Primary Examiner* — Ian J Lobo
(74) *Attorney, Agent, or Firm* — Kevin Brayton McGoff

(57) ABSTRACT

A control system for use in a marine seismic survey is provided. The system may include one or more processors configured to receive a desired position for one or more seismic streamers during the marine seismic survey. The one or more processors may be further configured to determine a current position for the one or more seismic streamers and to adjust a position of a steering device on each streamer, based upon, at least in part, a comparison between the current position of the one or more seismic streamers and the desired position of the one or more seismic streamers.

5 Claims, 11 Drawing Sheets

(56) References Cited

U.S. PATENT DOCUMENTS

2014/0233350 A1* 8/2014 Stokkeland .......... G01V 1/3808
367/15

OTHER PUBLICATIONS

International Search Report and Written Opinion issued in PCT/US2014/039962 on Sep. 18, 2014, 17 pages.
International search report and written opinion for the equivalent PCT patent application No. PCT/US2014/039962 issued on Sep. 18, 2014.

* cited by examiner

SYSTEM AND METHOD FOR SEISMIC STREAMER CONTROL

CROSS-REFERENCE TO RELATED APPLICATION

This application claims the benefit of U.S. Provisional patent application Ser. No. 61/828,345 filed May 29, 2013, which is incorporated herein by reference in its entirety.

BACKGROUND

Seismic data acquisition may be conducted by towing some number of streamer sections behind a vessel. The streamer sections may have varying types of construction and sensor mounting in the streamer. Data recorded on these streamers are stored in memory on the towing vessel.

Marine seismic acquisition systems typically include, among other parts, controlled sources generating seismic waves (e.g., pulses) and receivers, also known as "hydrophones," recording the waves reflected at each interface between sub-surface layers. These receivers are embedded in long cables called streamers which are towed in parallel by seismic vessels, together with other components, thereby making up a streamer spread. Ranging from 4 up to 12 kilometers, the streamers are separated from each other in the cross line direction by the use of deflectors located at each end of the spread generating a side force called lift.

It is desired to tow a seismic spread as quickly as safety and efficiency will allow. It is also desirable to tow the spread to cover as much lateral distance as safety and efficiency will allow. Some issues relating to safety are the maximum tension that the spread can withstand. As the spread is towed faster, drag increases. If tension at any portion of the spread becomes too large for the relevant component, such can break. Also, the distance between streamers (often towed in parallel, but also towed in other configurations such as "fan" configurations) relates to potential for entanglement. Since acts of nature and errors in calculation and control can make positioning of streamer imprecise and reduced at times, a shorter distance between the streamers can increase risk of entanglement. Similar issues are also faced by other components of the spread, including deflectors, tail buoys, etc.

While these issues have been addressed when towing a spread in a straight line, they have not been addressed when a vessel tows a spread along a nonlinear course such as a turn, or in a circular pattern (coil shooting). In those nonlinear towing cases, the outer portion of the spread (with respect to the arc of the turn) will experience an increased velocity through the water with respect to the interior portions of the spread. This increased velocity can result in increased drag and tension on components of the spread. As noted, the increased drag and tension can increase the potential for component failure. Also, the portions of the spread in the interior can move slowly and therefore become more susceptible to natural forces such as currents.

One way to mitigate the negative factors experienced by the increased velocity of the outer portions of the spread (fast moving) and the inner portions of the spread (slow moving) is by reducing the lateral outward distance of the spread, i.e., to narrow the spread. However, doing such introduces various issues that have not yet been addressed, such as efficient transition between linear towing into, through and out of a turn with respect to minimizing possibility of entanglement, maximizing speed and efficiency, and also reducing possibility of equipment failure.

Various embodiments herein address a number of these issues.

SUMMARY OF DISCLOSURE

In one implementation, a control system for use in a marine seismic survey is provided. The system may include a processor that may receive a desired position for the seismic streamers during the marine seismic survey. The processor may determine a current position for the seismic streamers and may adjust a position of a steering device on each streamer, based upon, at least in part, a comparison between the current position of the seismic streamers and the desired position of the seismic streamers.

In some implementations, the steering device may be a deflector and the processor may control an angle of the deflector to obtain the desired position of the streamers. The processor may receive real-time data from the streamers. The processor may automatically adjust the position of the steering device on each streamer based upon, at least in part, the real-time data. The control system may include a graphical user interface that may display the current position and the desired position of the streamers. The graphical user interface may allow for manual or automatic control of the control system. The adjustment may be performed in order to obtain a desired separation distance between two of the streamers. The processor may control a plurality of deflectors associated with the streamers.

In another implementation, a method for performing a seismic survey is provided. The method may include towing a seismic spread including two outer deflectors and two outer streamers in a substantially straight course in a first direction for a predefined distance. After completing towing along the first distance, the method may include traveling through a turn wherein the deflectors each travel along a predefined curved path for a radial turn of approximately 180 degrees. After the turn, the method may include traveling along a substantially straight course that is substantially parallel to the first course, and towing in an opposite direction to the first direction. The method may further include predefining a track for each deflector to travel and, using a control system, automatically adjusting a position of the deflector to maintain the deflector on the predefined track wherein the track of each deflector being separated by a first lateral distance outside of the turn, and being separated by a second lateral distance that is smaller than the first distance when in the turn.

In some implementations, the predetermined track between the first lateral distance and the second lateral distance of the deflectors may be non-linear. The predetermined track between the first lateral distance and the second lateral distance of the deflectors may be partially tapered. A lateral width of the plurality of streamers may include a first lateral distance outside of the turn, and a second lateral distance that may be smaller than the first lateral distance when in the turn. The track of each of the plurality of streamers may be alternated so that one is higher or lower than an adjacent streamer, so as to allow for a tighter grouping of the streamers.

In another implementation, a method for performing a seismic survey is provided. The method may include towing one or more seismic streamers using a vessel having a seismic streamer control system associated therewith. The method may further include storing a desired position for one or more seismic streamers during the marine seismic survey at the control system and determining a current position for the one or more seismic streamers. The method may also include automatically adjusting a position of a steering device on each streamer, based upon, at least in part, a comparison between the current position of the one or more seismic streamers and the desired position of the one or more seismic streamers.

In some implementations, the method may include controlling an angle of the deflector to obtain the desired position of the one or more streamers. The method may further include receiving real-time data from the one or more streamers and automatically adjusting the position of the steering device on each streamer based upon, at least in part, the real-time data. The method may also include displaying, at a graphical user interface, at least one of the current position and the desired position of the one or more streamers. The graphical user interface may allow for manual or automatic control of the control system. The adjustment may be performed in order to obtain a desired separation distance between two of the one or more streamers.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The following description concerns a number of embodiments and is meant to provide an understanding of the embodiments. The description is not in any way meant to unduly limit the scope of any present or subsequent related claims.

As used here, the terms "above" and "below," "up" and "down," "upper" and "lower," "upwardly" and "downwardly," and other like terms indicating relative positions above or below a given point or element are used in this description to more clearly describe some embodiments of the present disclosure.

Various embodiments provided herein are directed towards a control system for use in a marine seismic survey and related methods. The system may be configured to automatically control the position or path of travel of one or more seismic streamers during a seismic survey. This automatic control can be based on various parameters such as minimum distance between the streamers, maximum or minimum lateral position of the streamer or spread, minimum velocity of the streamer or spread, maximum velocity of the streamer or spread, and maximum or minimum tension or drag allowed on components of the spread. The system may include one or more processors configured to receive a desired position for one or more seismic streamers or components of the spread during the marine seismic survey. The control system may be further configured to determine a current position for the one or more seismic streamers and to adjust a position of the streamer, velocity through the water of various components of the spread, and related drags and tensions, by way of a steering device and a comparison between the current position of the one or more seismic streamers and the desired position of the one or more seismic streamers. A detailed description of various methods and systems used to derive or detect streamer position is included in U.S. Pat. No. 5,668,775 that is incorporated herein by reference in its entirety. Further, various methods and devices for controlling the streamer positions are disclosed in U.S. Pat. No. 7,080,607 that is incorporated herein by reference in its entirety.

Figure 1:
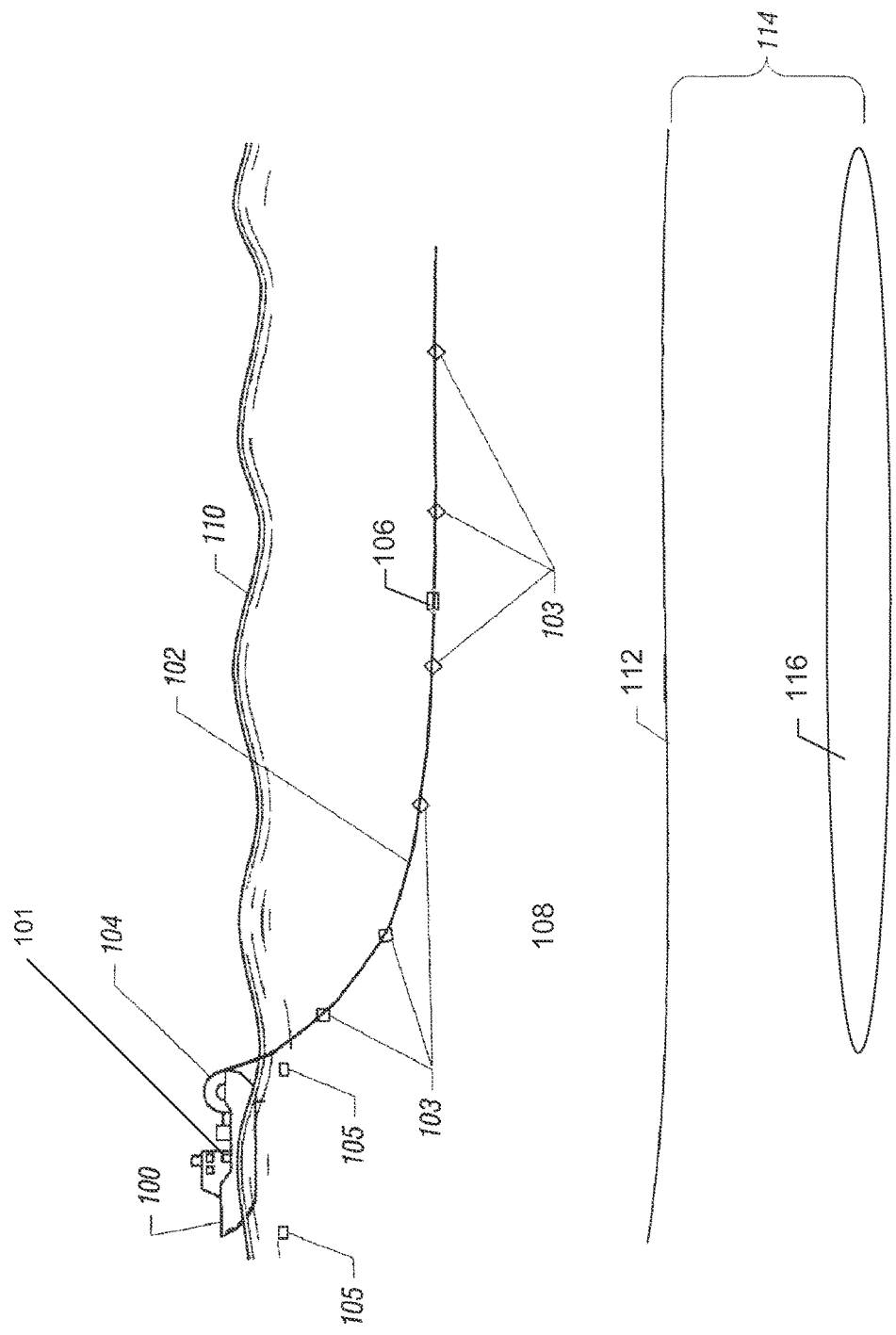
FIG. 1 illustrates an example of a sea vessel that may have a seismic streamer control system associated therewith in accordance with one or more embodiments of the present disclosure.

FIG. 1 illustrates a sea vessel 100 that may include an onboard control system 101 configured to control the position and track of one or more seismic streamers during a marine survey. Control system 101 may include various processors and computing devices configured to communicate (e.g., electrically, wirelessly, etc.) with the seismic streamers and/or devices associated with the streamers (e.g., deflectors, steering devices, sensors, etc.). In some embodiments, this control may occur in real-time, automatically, and may be based upon data received from one or more sensors as is discussed in further detail hereinbelow.

Sea vessel 100 may include a reel or spool 104 for deploying a streamer 102, which may be a cable-like structure having a number of sensors 103 for performing a subterranean survey of a subterranean structure 114 below a sea floor 112. A portion of streamer 102, and more particularly, sensors 103, may be deployed in a body of water 108 underneath a sea surface 110. Streamer 102 may be towed by the sea vessel 100 during a seismic operation.

Herein, the term "streamer spread" is intended to cover a streamer or streamers that is/are towed by sea surface vessel as well as connected and related equipment such as deflectors, connectors, tail buoys and steering devices.

In some embodiments, streamer 102 may have a length of 1 kilometer to 12 kilometers or more.

Also depicted in FIG. 1 are a number of signal sources 105 that may produce signals propagated into the body of water 108 and into subterranean structure 114. The signals may be reflected from layers in subterranean structure 114, including a resistive body 116 that can be any one of a hydrocarbon-containing reservoir, a fresh water aquifer, an injection zone, and so forth. Signals reflected from resistive body 116 may be propagated upwardly toward sensors 103 for detection by the sensors. Measurement data may be collected by sensors 103, which may store the measurement data and/or transmit the measurement data back to data storage device 106.

In some embodiments, sensors 103 may be seismic sensors, which may be implemented with acoustic sensors such as hydrophones, geophones, and/or fiber optic based sensor systems. The signal sources 105 may be seismic sources, such as air guns, marine vibrators and/or explosives. In another implementation, the sensors 103 may be electromagnetic (EM) sensors 103, and signal sources 105 may be EM sources that generate EM waves that are propagated into subterranean structure 114. In some embodiments, the source, which may be towed by the same vessel or another vessel in proximity, creates an energetic pulse that travels through the ocean and into the subterranean earth formations. This pulse reflects off of the formations in the subterranean earth formations and the reflected pulse may be detected by the seismic sensors. From the detected signals, information about the subterranean formation can be developed.

Although not shown in FIG. 1, streamer 102 may further include additional sensors (e.g., depth sensors), which may be used to detect a position of respective sections of streamer 102. In accordance with some embodiments, data from these additional sensors may be sent back to control system 101 and/or data storage device 106 to update information regarding which sections of streamer 102 are in body of water 108, and which sections of streamer 102 are outside the body of water. Specific streamer location data may also be transmitted/received.

In some embodiments, streamer 102 may include any number, type and configuration of sensors. Some of these may include, but are not limited to, hydrophones, geophones, particle displacement sensors, particle velocity sensors, accelerometers, pressure gradient sensors, or combinations thereof.

In some embodiments, streamer 102 may include a multi-component streamer, which means that streamer 102 may contain particle motion sensors and pressure sensors. The pressure and particle motion sensors may be part of a multi-component sensor unit. Each pressure sensor may be configured to detect a pressure wavefield, and each particle motion sensor may be configured to detect at least one component of particle motion that is associated with acoustic signals that are proximate to the sensor. Examples of particle motions include one or more components of a particle displacement, one or more components (inline (x), crossline (y) and vertical (z) components of a particle velocity and one or more components of a particle acceleration. A more thorough discussion of particle motion sensors may be found in U.S. Patent Publication 2012/0082001, which is incorporated by reference herein in its entirety. A more thorough discussion of streamers may be found in U.S. Pat. No. 8,260,555, which is incorporated by reference herein in its entirety.

Figure 2:
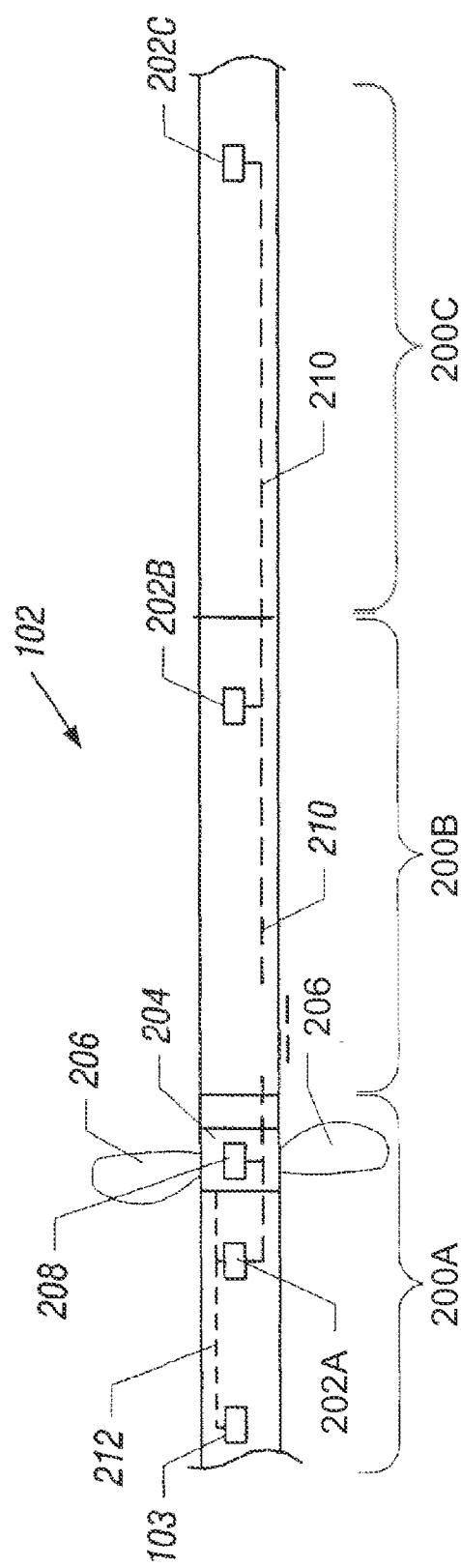
FIG. 2 illustrates an example of a streamer section in accordance with one or more embodiments of the present disclosure.

FIG. 2 shows one particular embodiment depicting an example of a portion of streamer 102, including sections 200A, 200B, and 200C. In this particular embodiment, section 200A may include a corresponding sensor 103 (such as a seismic sensor) for detecting subterranean features. Sensor 103 may be deployed intermittently (e.g., every other section) throughout streamer 102 in one example. In some embodiments, each section may have a corresponding sensor 103 for detecting subterranean features.

In the ensuing discussion, reference is made to seismic sensors. Note, however, in other implementations, the sensors used for detecting subterranean features may include any suitable sensors or sensing equipment. Note also that the arrangement in FIG. 2 is an example arrangement. Different arrangements may be used in other implementations. For example, the recording sensors may be within 10's of meters to the towing vessel Global Navigation Satellite System ("GNSS") antenna. Streamer 102 may also include additional equipment that is not shown in FIG. 2, for example, one or more data storage devices (e.g., data storage device 106) as is discussed in further detail below.

Section 200A may further include a second sensor 202A, which in some embodiments is a depth sensor to detect the depth of the section of the streamer 102 in the body of water 108. Each of the other sections 200B, 200C depicted in FIG. 2 also includes a corresponding second sensor 202B, 202C (e.g., depth sensors).

Section 200A may further include steering device 204 to help steer streamer 102 in the body of water. Steering device 204 may include control surfaces 206 (in the form of blades or wings) that may be rotatable about a longitudinal axis of streamer 102 to help steer streamer 102 in a desired lateral direction. Steering device 204 may be provided intermittently (e.g., every other section) throughout streamer 102.

In some implementations, steering device 204 may include a battery (or other power source) 208 that may be used to power the steering device 204. Battery 208 may also be used to power the depth sensor 202A in the section 200A, as well as depth sensors 202B, 202C in other sections 200B, 200C that are relatively close to the section 200A containing the steering device 204. Power from the battery 208 may be provided over electrical conductor(s) 210 to the depth sensors 202A, 202B, 202C. Battery 208 may also be configured to power a data storage device (e.g., 106, 300, etc.) and in some cases battery 208 may be included within the data storage device. In alternative implementations, power may be provided from an alternative source, such as from the sea vessel 100, solar charger associated with a buoy, over an electrical cable 212 (or fiber optic cable) that may be routed through the streamer 102. To derive power from a fiber optic cable, each sensor 202 would include a conversion circuit to convert optical waves into electrical power. An alternative source of power may include a wave powered generator. A more thorough discussion of wave generated power may be found in U.S. Patent Publication 2009/0147619, which is incorporated by reference herein in its entirety.

In accordance with some embodiments, depth sensors 202 (202A, 202B, 202C shown) may be used to detect which sections 200 of streamer 102 are deployed in the body of water 108. Depth sensors 202 may provide data regarding whether corresponding sections are in the body of water 108 by communicating the data over a communications link (e.g., electrical or fiber optic cable) 212 that is run along the length of the streamer 102 to the reel 104 on the sea vessel 100 and/or to data storage device 106. The data provided from depth sensors 202 may be received at and stored within data storage device 106. Some or all of the sensors described herein may communicate with control system 101, 303 to provide real-time location information that may be used as the basis for adjusting the positioning of the streamers, deflectors, etc.

One particular type of marine seismic survey is referred to as a "towed-array" seismic survey. In such a survey, a survey vessel tows an array of equipment along a straight sail line.

The array may include a number of seismic streamers, in some cases up to eight, twelve, or even sixteen, that can each be several kilometers long. The streamers may be populated with a number of instruments, for example, seismic receivers such as hydrophones. The array may also include a plurality of seismic sources. As the array is towed along the sail line, the streamers can straighten and roughly parallel each other.

Figure 3:
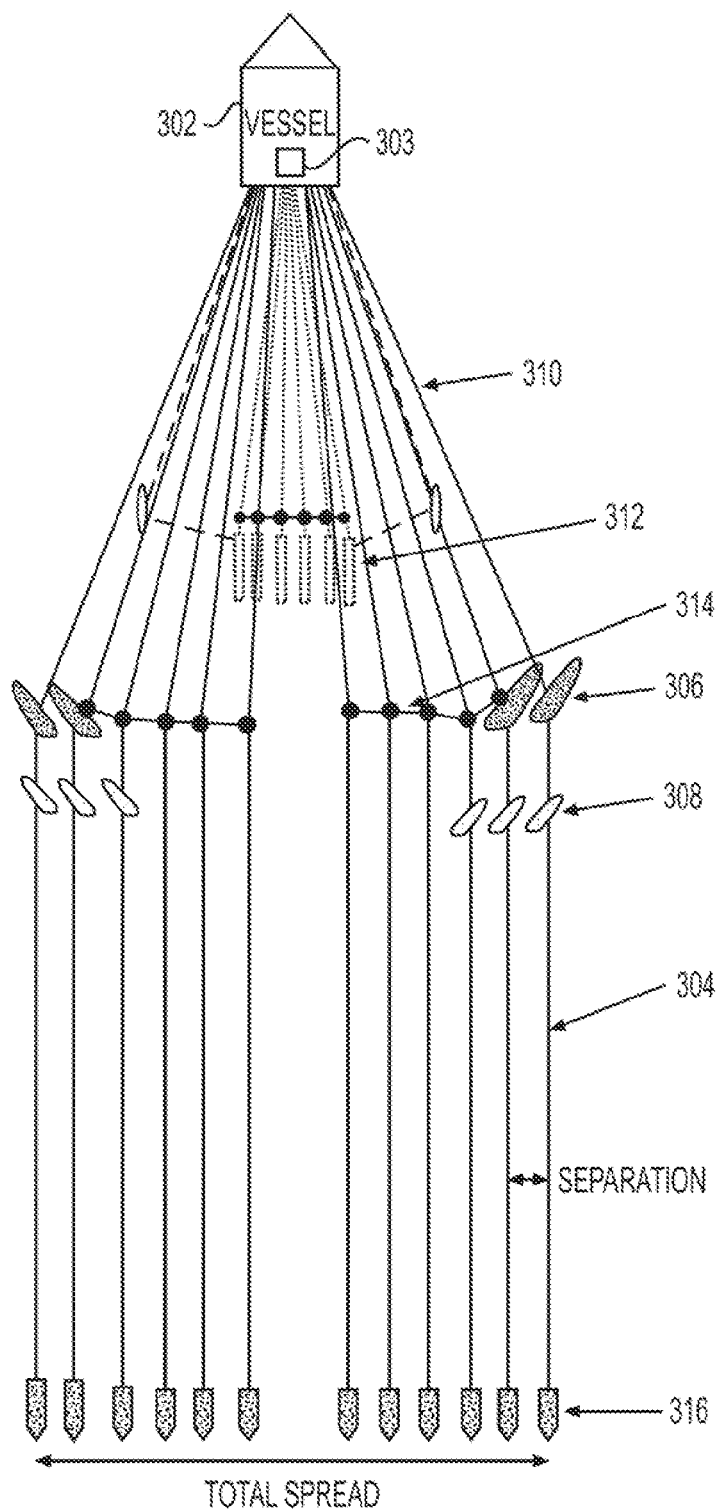
FIG. 3 illustrates another example of a sea vessel that may have a seismic streamer control system associated therewith in accordance with one or more embodiments of the present disclosure.

Referring now to FIG. 3, an embodiment 300 depicting a vessel 302 having a seismic streamer control system 303 is provided. In some embodiments, the streamers 304 may range from 4 up to 12 kilometers, and may be separated from each other in the cross line direction by the use of deflectors 306 located at each end of the spread generating a side force called lift. Deflectors 306 may be similar to the steering devices shown in FIG. 4 (Deflectors available from the Assignee of the present application are referred to as "Monowings"). FIG. 3 depicts a schematic top view of an example seismic streamer spread. In this particular example, additional optional small deflectors 308 may be located behind deflectors 306. These may be used to take the streamers out of the wake of deflectors 306 to reduce the noise level (These secondary deflectors are available from the Assignee of the present application and are referred to as "Miniwings"). Numerous additional components may also be included, some of which may include, but are not limited to, lead-in 310, guns 312, distance rope 314, and tail buoy 316.

Figure 4:
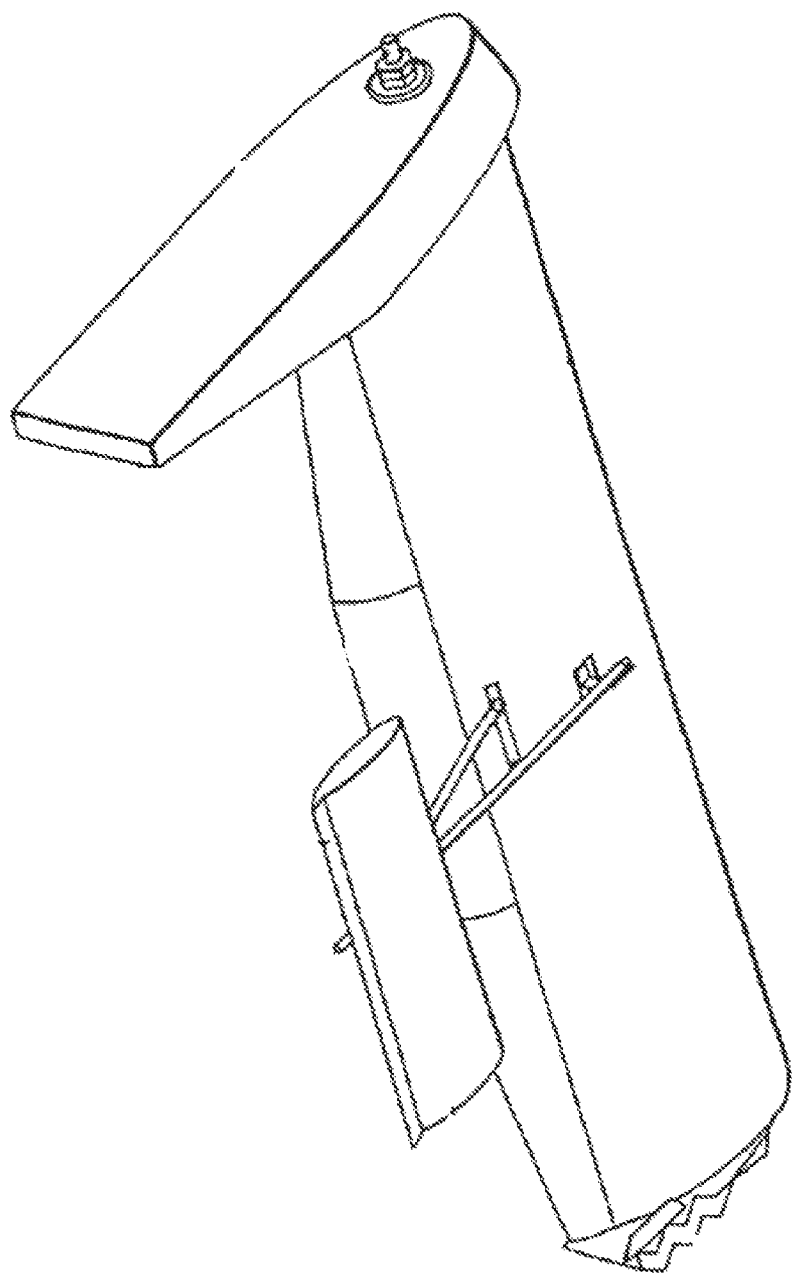
FIG. 4 illustrates an example of a deflector in accordance with one or more embodiments of the present disclosure.

Referring also to FIG. 4, an example of a deflector that may be used in accordance with the teachings of the present disclosure is provided. Additional information regarding deflector technology may be found in U.S. Pat. No. 7,156,035, which is incorporated by reference in its entirety.

As noted, the deflector device may be attached to the front portion of a seismic spread and may provide a lateral force to at least one seismic streamer in the spread. It should be noted that the particular deflector shown in FIG. 4 is provided merely by way of example as numerous deflector designs may be used in accordance with the teachings of the present disclosure. One design is a deflector having a wing-shaped deflector body having a remotely-operable pivotal lever or "boom" that extends rearward from a point near the middle of the trailing edge of the wing-shaped body. In use, the wing-shaped deflector body may be suspended beneath a float so as to be completely submerged and positioned generally vertically in the water, and may be connected to the towing vessel by means of a tow line, while the tow may be connected to the end of the boom remote from the wing-shaped body. In operation, as the device is pulled through the water, the wing-shaped body may produce a sideways force, or "lift," which may move the tow laterally. This lift may be varied by adjusting the angle of the boom from the vessel, thus permitting the lateral offset of the tow from the course of the vessel to be varied in use.

In some embodiments, in use, rolling stability of the device is provided by the connection to the float, while stability of the device about a vertical axis is provided by the drag produced by the tow. The deflectors may be large, in some cases 7.5 m high by 2.5 m wide, and weigh several tons. In some cases they may be suspended around 2 m to 8 m below the float by means of a fiber rope, and are also provided with a safety chain intended to prevent separation of the float and deflector wing in the event that the rope breaks.

In some embodiments, the deflector device may be configured for use with a tow line between a towing vessel and a tow in water behind the vessel. As shown in FIG. 4, the deflector device may include a wing-shaped body adapted to be coupled to the tow line and shaped to produce in use a sideways force which urges the tow line laterally with respect to the direction of movement of the towing vessel. The deflector device may further include a boom extending rearward from the wing-shaped body, the end of the boom remote from the wing-shaped body being adapted to be connected to the tow. In some embodiments, the angle between the boom and the wing-shaped body may be remotely adjustable (e.g., via control system 101, 303, etc.) to vary the sideways force produced by the wing-shaped body. The deflector device may further include an elongate float member whose underside may be directly connected to the upper end of the wing-shaped body.

According to another deflector design, there is provided a deflector device for use with a tow line between a towing vessel and a tow in water behind the vessel. The device may include a principal wing-shaped body adapted to be coupled to the tow line and shaped to produce in use a sideways force, which urges the tow line laterally with respect to the direction of movement of the towing vessel. The device may further include a boom extending rearward from the principal wing-shaped body and an auxiliary wing-shaped body, smaller than the principal wing-shaped body, secured to the end of the boom remote from the principal wing-shaped body. The auxiliary wing-shaped body may be shaped so as to produce in use a sideways force in generally the opposite direction to that produced by the principal wing-shaped body. An elongate float member whose underside may be directly connected to the upper end of the principal wing-shaped body may also be included.

In this design, the angle between the boom and the principal wing-shaped body may be remotely adjustable to vary the sideways force produced by the principal wing-shaped body. Additionally and/or alternatively, the angle between the boom and the principal wing-shaped body may be substantially fixed. The deflector device may further include remotely operable means for varying the angle of the auxiliary wing-shaped body to vary the sideways force produced by the auxiliary wing-shaped body, and thereby vary the sideways force produced by the principal wing-shaped body. In either case, the end of the boom remote from the principal wing-shaped body may be adapted to be connected to the tow. This remote control may be done electronically and can be done in real time in connection with central control system 101, 303.

It should be appreciated that the wings can be adjusted by way of motors electrically or hydraulically, and that numerous wing adjustment devices/designs are available in the art. Additionally and/or alternatively, in some embodiments cables may be used to alter the angle of the wing. Any known mechanical connection can be used to adjust the wing angle of the deflector.

In some implementations, the centre of buoyancy of the float member may be near the trailing edge of the first mentioned (or principal) wing-shaped body, and the angle between the longitudinal axis of the float member and the chord of the principal wing-shaped body may be selected such that, in use, the longitudinal axis of the float member is aligned with the towing direction when the chord of the principal wing-shaped member is at its mean or normal angle to the towing direction.

In some embodiments, the deflector's wing-shaped body may be made from titanium, while the float member may be made either from titanium or from a fiber-reinforced composite material. However, deflector's of any suitable material may be used without departing from the scope of the present disclosure.

As discussed above, the deflector designs may be used with a marine seismic survey, which may include towing a plurality of laterally spaced seismic deflectors/streamers over an area to be surveyed. The position of at least one of the deflectors may be controlled, and accordingly the streamers with the deflector device may be controlled as well.

Figure 5:
FIG. 5 illustrates an example of a sea vessel that may be in the process of performing a turn in accordance with one or more embodiments of the present disclosure.

Seismic survey planning may involve defining straight shooting lines separated by a line change phase also called a turn as shown in FIG. 5. These turns can be located according to the survey area so that the guns start shooting again once vessel 502 engages to a new line. In some cases, it is desired that the entire length of streamers are at least substantially straight before starting shooting, which makes the turn phase require more time. However, it is also possible to have the streamers in other configurations (e.g., fan mode, etc.) and to follow a predefined path that is not precisely parallel with the streamer, i.e., the streamer may be angled with respect to the direction of vessel 502 as it travels. It should be noted that often times the intended streamer configuration (e.g., straight, fan, etc.) may be interrupted by currents and/or inclement weather, etc., and is not achieved. It is also possible to shoot through the turns and also to collect data. This can also be done when following circular paths, which is referred to as coil shooting/surveying.

It is desirable to reduce the time a vessel spends on a survey, and vessel towing speed is a relevant factor. Thus, increasing speed and efficiency in a turn either by increasing the speed at which the vessel travels though the turn, and/or shortening the distance traveled in the turn by allowing for a shorter turn radius, can be valuable. An associated issue therewith is the width of the spread, since the outermost deflectors/streamers (should the width of the spread remain constant through the turn) may experience an increased speed though the water due to the traveling on the outer part of the turn and associated increase in drag and tension. In contrast, the streamers on the inner part of the turn may experience a reduced velocity and can actually go slack, which may be undesirable. The difference in velocities as well as the additional drag experienced by the outer streamers (sometimes resulting in failure if too great), limit both the radius of the turn as well as the velocity the vessel can safely achieve.

Accordingly, one approach may involve reducing the lateral spacing of the deflectors, the streamers and/or the spread when going through a turn. In some embodiments, this may be achieved by adjusting the deflectors and the lift the deflectors apply to the spread to establish the lateral spacing. This can be done by remotely operating the deflectors to change/control lift and reduce separation. In some embodiments, this may be achieved by changing the angle of attack of the surfaces of the deflector. As used herein, the phrase "angle of attack" may refer to the angle the "wing" surfaces have when traveling though the water thus creating "lift" and lateral force. However, in some cases given the length of the streamers and the size and complexity of the spread, it is not merely a case of changing the deflectors from one angle (corresponding to wide separation) to another angle (corresponding to narrow separation) to move from a wide lateral spacing for outside the turn and through the survey area, to a narrow lateral spacing for traveling through the turn. Accordingly, the optimization and control techniques described herein may be used to address these issues.

Figure 6:
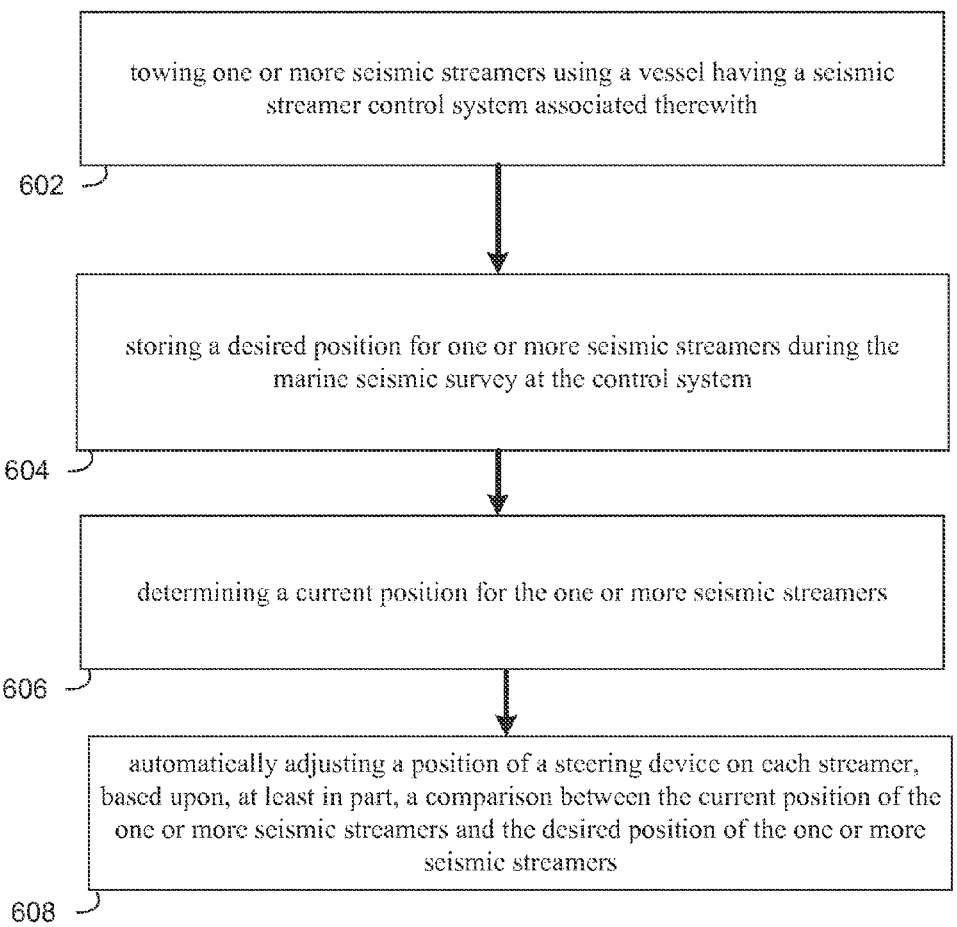
FIG. 6 is a flow diagram of a process in accordance with one or more embodiments of the present disclosure.

Referring now to FIG. 6, embodiments of the present disclosure may allow for automated deflector control using a control system. The method may include towing (602) one or more seismic streamers using a vessel having a seismic streamer control system associated therewith and storing (604) a desired position for one or more seismic streamers during the marine seismic survey at the control system. The method may further include determining (606) a current position for the one or more seismic streamers and automatically adjusting (608) a position of a steering device on each streamer, based upon, at least in part, a comparison between the current position of the one or more seismic streamers and the desired position of the one or more seismic streamers.

In some implementations, the steering device may be a deflector as discussed herein. Central control system 101, 303 may be configured to control an angle of the deflector to obtain the desired position of the one or more streamers. The control system may be further configured to receive real-time data from the one or more streamers using any suitable communication technique. The control system may be further configured to automatically adjust the position of the steering device on each streamer based upon, at least in part, the real-time data. The adjustment may be performed in order to obtain a desired separation distance between streamers. The control system may be further configured to control a plurality of deflectors on at least one of the one or more streamers.

In some embodiments, the control system may further include a graphical user interface configured to display at least one of the current position and the desired position of the one or more streamers. This graphical user interface may be located onboard the vessel or alternatively at a remote location. The graphical user interface may allow for manual or automatic control of the control system.

In another implementation, a method for performing a seismic survey is provided. The method may include towing a seismic spread including two outer deflectors and two outer streamers in a substantially straight course in a first direction for a predefined distance. After completing towing along the first distance, the method may include traveling through a turn wherein the deflectors each travel along a predefined curved path for a radial turn of approximately 180 degrees. After the turn, the method may include traveling along a substantially straight course that is substantially parallel to the first course, and towing in an opposite direction to the first direction. The method may further include predefining a track for each deflector to travel and, using a control system, automatically adjusting a position of the deflector to maintain the deflector on the predefined track wherein the track of each deflector being separated by a first lateral distance outside of the turn, and being separated by a second lateral distance that is smaller than the first distance when in the turn.

In some implementations, the predetermined track between the first lateral distance and the second lateral distance of the deflectors may be non-linear. The predetermined track between the first lateral distance and the second lateral distance of the deflectors may be partially tapered. A lateral width of the plurality of streamers may include a first lateral distance outside of the turn, and a second lateral distance that may be smaller than the first lateral distance when in the turn. The track of each of the plurality of streamers may be alternated so that one is higher or lower than an adjacent streamer, so as to allow for a tighter grouping of the streamers.

In some embodiments, central control system 101, 303 may be connected to a motor or other device that controls the angle of attack of the deflector so that the deflectors go through a predetermined move between a wide lateral position to a narrow lateral position. The central controller may gradually and at a predefined timing/rate alter the angle of attack of the deflector to gradually change the lift of the deflector as it moves from a wide tow position to a narrow tow position. This change from wide to narrow may be done before the turn or in a transition into the turn as the spread enters the turn. This change from narrow to wide may be performed once outside the turn or in a transition out of the turn as the spread exits the turn. The transition may also be done once in the turn to allow fast travel of the vessel and spread.

According to another embodiment, tracks of the spread elements (e.g., streamers, deflectors, etc.) may be predefined ahead of time before entrance into the turn, and the deflector angles may be controlled so as to guide the deflectors and the streamers along the predefined tracks thereby moving from a wide lateral spread for straight towing to a narrow spread for traveling through a turn. Additionally and/or alternatively, the tracks may be determined upon entrance to the turn, or determined in transition into the turn. This may be achieved using the central control system or another computer navigation system.

In some embodiments, central control system 101, 303 may be configured to establish a defined track for each deflector as they transition from a wide spread for towing straight while in a survey area, to a narrow spread for entering into and traveling though a turn. The defined track may be prepared by the central control system, or may be input to the central control system.

In some embodiments, central control system 101, 303 may be a computer system/processor and may be located on the vessel or in a remote location where it communicates with the vessel and the spread. The central control system may be in communication with any number of devices, including, but not limited to, the vessel's navigation system, a global navigation system, as well as a spread positioning system that detects and determines positions of the streamers and deflectors.

In some embodiments, central control system 101, 303 may be configured to monitor the location of numerous points along the streamers, the deflectors and other spread elements. The monitoring of the spread may be performed using any suitable approach (e.g., using acoustic signals such as IRMA, which is used commercially by the Assignee of this application). In some embodiments, portions of the spread that are on the surface, including, but not limited to, floats attached to the deflectors or end of the streamers, may be monitored with communication systems (e.g., Global Positioning Systems ("GPS") attached thereto. Further, for any portion of the spread that is on the surface, radar may be used to monitor the location. Any other commercial method/system for determining streamer and spread position may also be used without departing from the scope of the present disclosure.

Accordingly, using the location information for the spread, the central control system may be configured to determine if the deflector (or other spread elements) is in the proper position, or predefined position along the track. If the central control system determines that the deflector position is in need of adjustment, the angle of attack of the deflector may be updated in real-time remotely to effect that change. Further, the central control system may use velocity information, current information and any other information available, with predictive programs/algorithms to predict the present and or future location of the deflectors and parts of the spread so as to preemptively adjust the angle of the deflectors in anticipation of future and/or current positional needs. These adjustments of the deflectors to follow the predefined tracks may occur in real-time, or adjustments can be made at periodic time intervals. In some embodiments, the adjustments may occur automatically or in an automated fashion. These adjustments may help alleviate need for rapid adjustments of the deflectors by anticipating future positional needs.

Embodiments of the present disclosure may provide the ability to continually update the angle of attack of the deflector, and therefore update the lift that may be applied to the lateral force on the spread. This may be beneficial given that oftentimes underwater sea currents may affect the location of the deflectors, streamers and the spread. For example, in a calm situation where the simple angle of attack for a narrow lateral spacing of the deflectors would lead to the deflectors traveling along a desired track, in the case of a large sea current such could end up in entanglement of the streamers. The central control system may monitor the position of the spread and update the angle of attack of the deflectors, which may help to alleviate such issues.

In some embodiments, the central control system may be configured to control the deflectors to reduce overshoot of the intended lateral spacing. For example, as a deflector moves between the wide/narrow lateral spacing (position), it may be possible for the momentum to make the deflector overshoot the desired lateral position. One way to compensate for this is to update the angle of attack to stabilize the deflector by rotating the angle of attack opposite to that which affected the initial move, in order to stop the deflector at the intended lateral position. This may be beneficial in a case where the transition between wide/narrow is done with rapidity as increase lateral speed of the deflector increases the change of overshoot. Also, the ability of the central control system to adjust the angle of attack of the deflector in real-time may allow for real-time adjustments when the deflector deviates from the desired lateral position. In this way, the system may compensate for overshoot in the direction the deflector traveled to arrive at the track, but also the other direction once compensation against overshoot is put in place.

Figure 7:
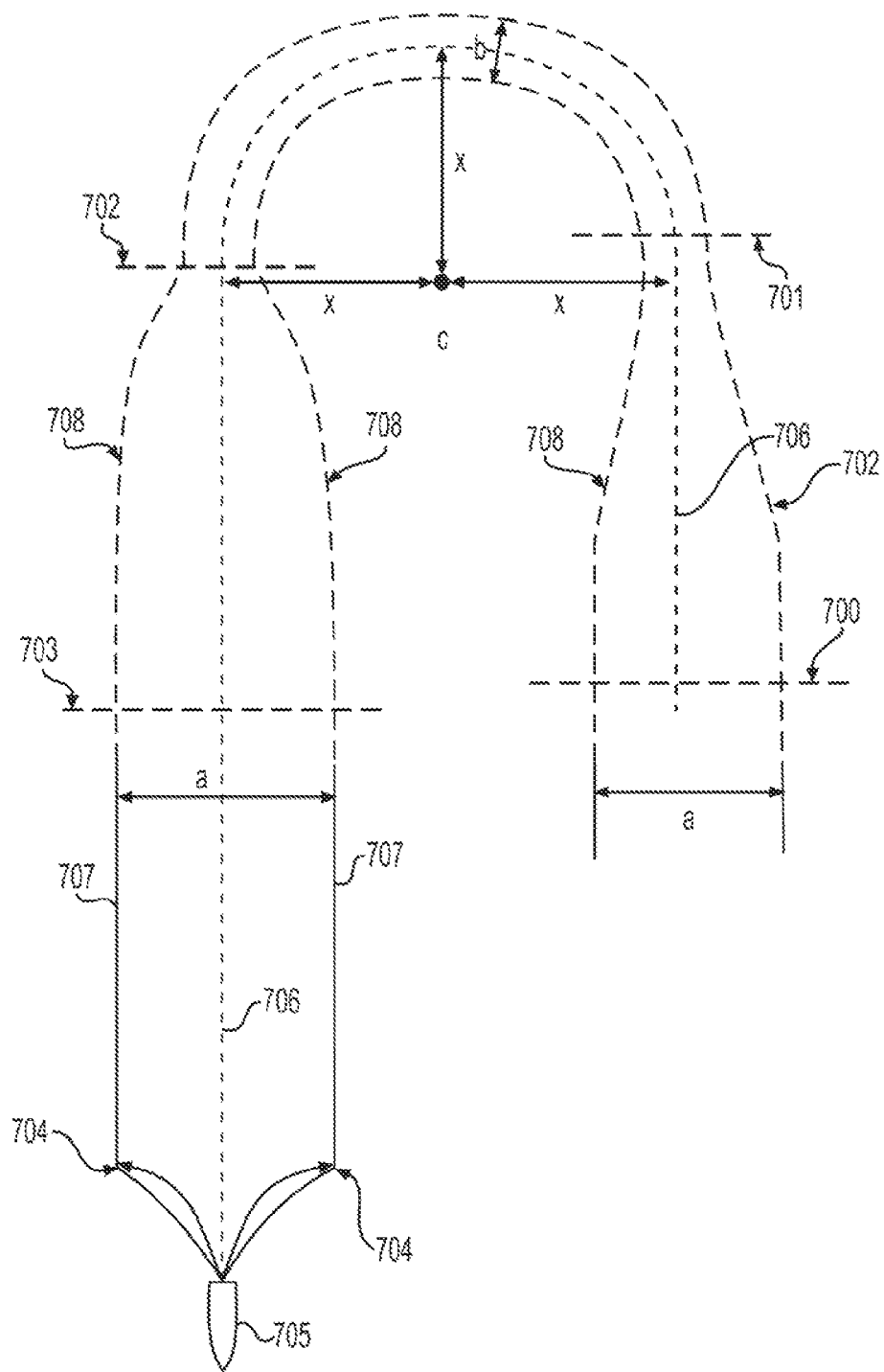
FIG. 7 illustrates another example of a turning sea vessel that may have a seismic streamer control system associated therewith in accordance with one or more embodiments of the present disclosure.

Referring now to FIG. 7, in some embodiments, the teachings of the present disclosure may allow for a gradual move from a wide to a narrow lateral spacing. Accordingly, it may be beneficial to gradually start transition of the spacing of the deflectors so that the resulting track is non-linear, where the deflector may move laterally most quickly in the mid part of the transition and may move more slowly as the deflector starts lateral movement and approaches the desired lateral position. This may result in the track being tapered at transition portions, for example, near the entrance and exit of the turn. At the transition the control system may gradually introduce the forces required to narrow/widen the lateral spacing of the deflectors. This may help reduce the chance of component failure. This is illustrated in FIG. 7 where a vessel 705 travels along a track 706. Deflectors 704 may be connected with the vessel by tow connectors that in turn connect with the streamers 707. It should be noted that the two outermost streamers 707 are shown here. It is envisioned that additional streamers are located between the two outermost streamers 707. Also, additional deflectors can be used inside the outermost deflectors 108 shown here. The deflectors 704 follow a deflector track 708, which in this figure matches the streamer path since the streamer 707 is attached directly behind the deflector 704. However, streamers do not need to be connected directly behind the deflectors 704. The deflector track 708 starts before the turn at a lateral spacing "a." Once the transition is reached at 700, the lateral spacing between the deflector paths 708 narrows gradually. This path 708 can be non-linear and can be tapered at parts. Once the deflector path 708 comes out of the transition and to the turn 701 the lateral spacing is "b." By way of the central control system the width can be maintained through the turn. The turn is shown here as being around a central point "c" with a radius "x," but can be other generally arc "U" type shapes. Also, the lateral spacing "b" can vary and does not need to be constant through the turn. Upon exit from the turn at 702, the deflector track 708 begins to widen and follow the widening track 108. This can again be non-linear and can be tapered at portions. At the end of the transition part 703 the deflector track 708 is again at the lateral spacing "a." It should be appreciated that similar principals as are applied in embodiments herein for the deflector 704 and the associated deflector track 708 can be applied to the streamers 107 and an associated streamer track since streamers can be steered laterally. That is, the same or similar central control system that has a predefined track 708 for the deflectors 704 can have a predefined track for streamers, and such streamer track can move from being laterally wider before the turn to being laterally narrower in the turn, the transition from wider to narrower can be non-linear and can be tapered at parts. The lateral steering may be performed using commercial products such as those available from the Assignees of this application.

In some embodiments, the streamers may be steered vertically to control their vertical position. The height of adjacent streamers to one another may be adjusted so that the height of one streamer is higher or lower than an adjacent streamer so that the streamers may be moved closer together in a lateral direction from one another without interfering or becoming too close. The streamers may also be stacked over and under each other to allow for further tightening of the spread. This allows for a tighter configuration while reducing the change of entanglement. The preceding description is meant to illustrate and help one skilled with the understanding of various embodiments. It is not mean to unduly limit any present or subsequent claims associated with this application.

According to embodiments, the tracks may not be predefined, and can be generated in real time based on various parameters such as velocity, drag and tension on the components of the streamer spread. According to other embodiments, predefined tracks can be deviated from automatically when the control system determined that thresholds for velocity, drag and/or tension will be reached.

Figure 8:
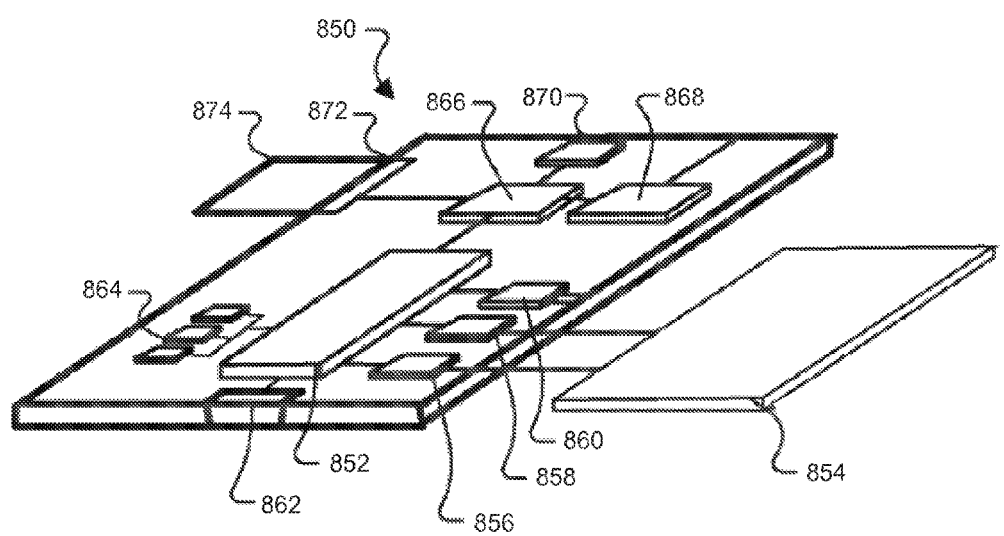
FIG. 8 illustrates an example of a computing device that may be used in accordance with the control system of the present disclosure.

Referring now to FIG. 8, an embodiment of a control system 800 consistent with the teachings of the present disclosure is provided. As discussed above, control system 800 may be located on a vessel (or off the vessel in a command center) and may be in electrical and/or wireless communication with streamers, sensors, deflectors, etc. Control system 800 may receive real-time feedback from these sensors and use that information to control particular aspects of the marine survey equipment.

Control system 800 may include computing device 850, a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, may be interconnected using various buses, and several of the components may be mounted on a common motherboard or in other manners as appropriate.

Processor 852 may execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

In some embodiments, processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

Accordingly, processor 852 may enable underwater high speed communications between the control system and one or more devices associated with the streamer or portion of the streamer. In this type of arrangement, and in addition to those discussed herein, power may be supplied from any suitable power supply. Data may be harvested using underwater high speed communication systems (e.g., Bluecomm).

In some embodiments, memory 864 may store information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 864, expansion memory 874, memory on processor 852, or a propagated signal that may be received, for example, over transceiver 868 or external interface 862.

Device 850 may communicate wirelessly through communication interface 566, which may include digital signal processing circuitry. Communication interface 866 may provide for communications under various modes or protocols, such as GSM voice calls, SMS, EMS, or MMS speech recognition, CDMA, TDMA, PDC, WCDMA, CDMA2000, Bluecomm, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) and/or GNSS (Global Navigation Satellite System) receiver module 870 may provide additional navigation and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Various additional and/or alternative components may also be included, such as those that may enable undersea communications.

Figure 9:
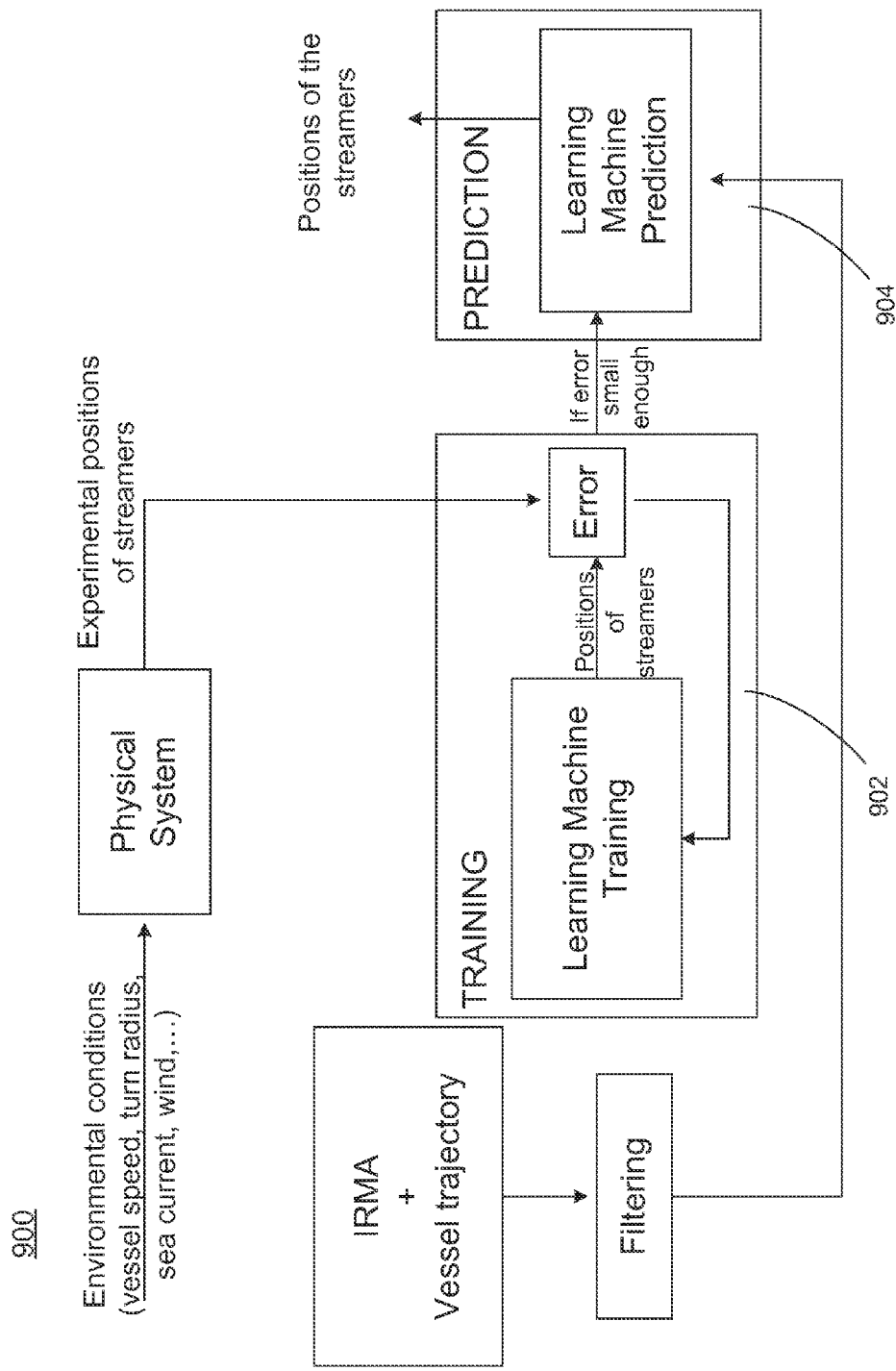
FIG. 9 illustrates an example of a spread prediction system in accordance with one or more embodiments of the present disclosure.
Figure 10:
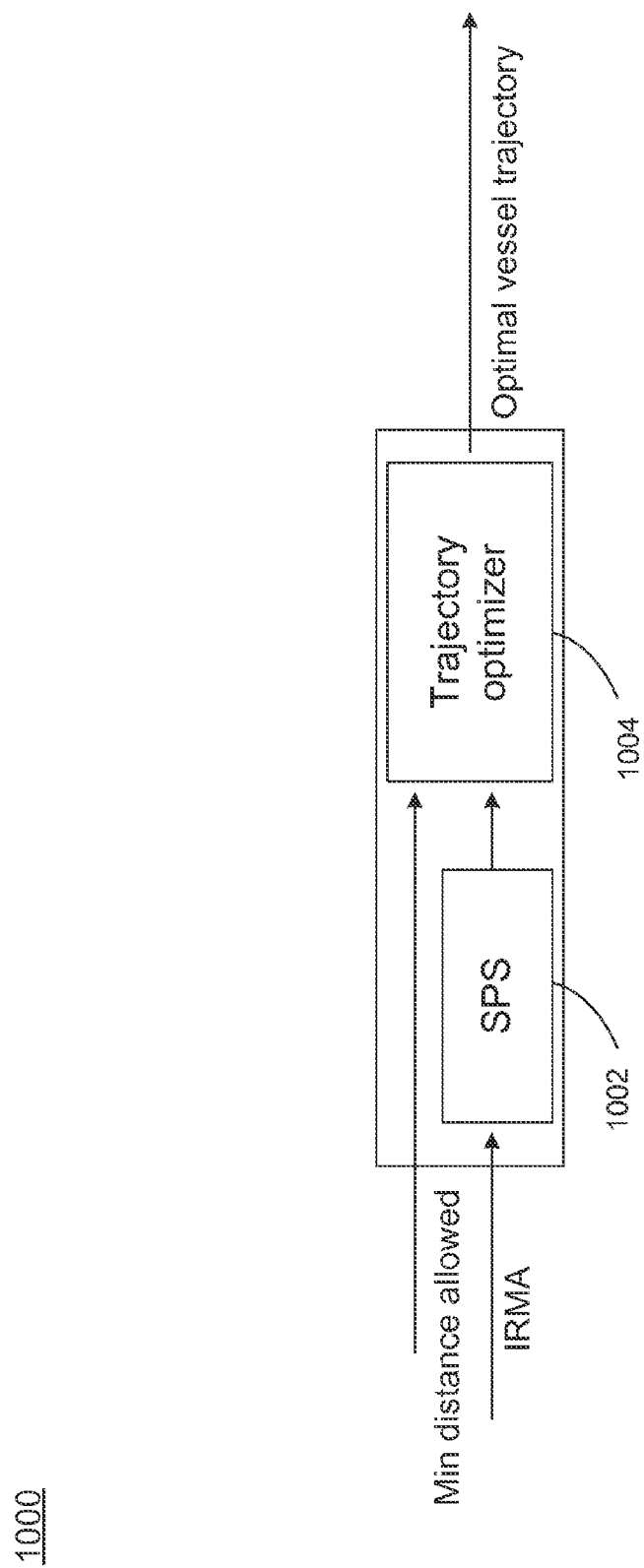
FIG. 10 illustrates an example of a spread prediction system in accordance with one or more embodiments of the present disclosure.
Figure 11:
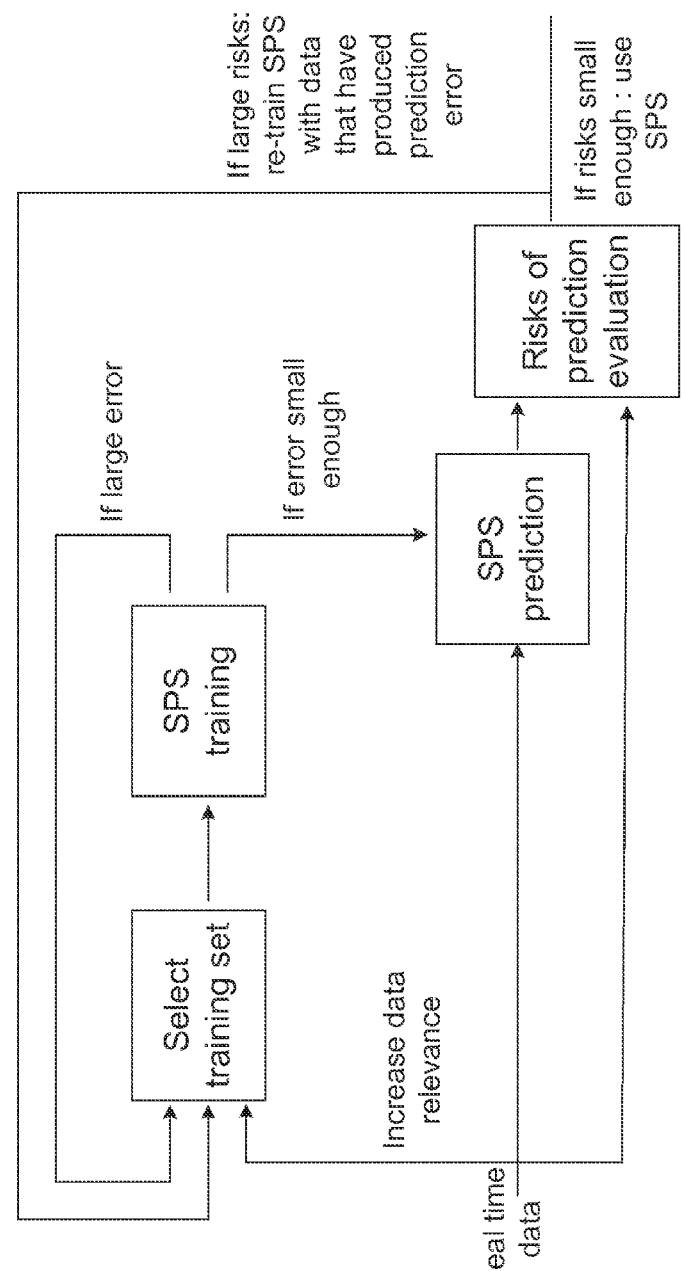
FIG. 11 illustrates an example of a spread prediction system in accordance with one or more embodiments of the present disclosure.

Referring now to FIGS. 9-11, in some embodiments, the central control system described herein may include a spread prediction system. This system may be configured to make a real-time, time prediction of the spread during towed marine seismic acquisitions and line changes. The spread prediction system may be configured to predict in real-time the future positions of the streamers. The speed and acceleration of any point on the streamers may be derived from the position.

In some embodiments, the spread prediction system could be used in order to reduce the time spent in line changes or infills for example. By predicting the position and hence the distances between streamers, an optimization of the trajectory of the vessel could be made (e.g., a reduction of the turn radius in the case of line changes). The risk associated with streamers tangling could be assessed and mitigated. The environmental conditions affecting the behavior of the spread would be accounted for based on forecast or past experiences.

In some embodiments, the spread prediction system may utilize learning machines to predict in time the positions of each streamer. The term "learning machine," as used herein, may refer to a computer-based program that has the ability to learn without being explicitly programmed. It may be fed with a training set containing past experiences. Once the machine is trained, it may be used with unknown sets of data.

During the training phase, the system may use the error between the outputs it has computed and the outputs it should have produced (e.g., the experimental positions of the streamers) to understand the links existing between the inputs and the outputs.

FIG. 9 provides a general description of an embodiment of a spread prediction system 900 in the case where the positions of the streamers are the parameters of interest. As shown in the Figure, the training module 902 may receive a variety of inputs, which may be used to determine the eventual position of the streamers via the prediction module. Environmental conditions may be incorporated into the training phase. Some environmental conditions may include, but are not limited to, vessel speed, turn radius, sea current, wind, etc. IRMA information and vessel trajectory information may be included in both the training 902 and prediction modules 904.

In some embodiments, the spread prediction system may be connected to the seismic positioning system of the vessel (e.g., the GPS of the boat), and possibly several other navigational and environmental inputs. The use of the spread prediction system may allow for a local optimization of the vessel trajectory. The vessel best path may be recomputed continuously or at fixed intervals.

Referring also to FIG. 10, an embodiment of the spread prediction system 1000 depicting a line change application is provided. In some embodiments, the vessel trajectory may be optimized based on inputs such as the GPS position of the streamers over time and the distances between streamers to avoid tangling.

In some embodiments, spread prediction system 1002 may receive, in real-time, the navigation information of each streamer. This information may include, but is not limited to, receiver positions from an acoustic network, GPS information, compass courses, accelerometer information, vessel headings, etc. In addition, environmental information on currents and sea-state may be incorporated. In some embodiments, the distances between streamers may be computed based on these receivers' positions. The series of previous distances between streamers and the future positions of the vessel may be the inputs of the learning machine. As discussed above, it should be noted that various other types of input parameters may be used in the spread prediction system depending on output sought (e.g., receivers' positions etc.). The parameters of the learning machines may be optimized using trajectory optimizer 1004. This optimization may be based upon, for example, the time horizon of prediction, the size of the training set, etc.

Referring now to FIG. 11, an embodiment depicting a system 1100 configured to determine a confidence measure of the prediction is shown. In order to increase the accuracy of the prediction, the training phase may be based on a clustering process where clusters of similar data are gathered. During the training phase, the learning machines may use the most relevant clusters to enhance the prediction. The clustering of the data may be performed, for example, on data collected in the same sea area and/or on data just collected. Other clusters of data could be generated based on non-obvious factors highlighted by using methods such as Principal Component Analysis or K-mean clustering. In some embodiments, the error of the prediction may be based on comparison with the IRMA derived geometry, as such, the embodiment of FIG. 11, may include the IPM errors to calculate a total error.

It should be noted that any suitable model may be used to predict the streamer shape. Some of these may include, but are not limited to, a prediction using a partial differential equations system, a prediction using state extrapolation (e.g., Kalman filters), a prediction using grey box modeling (e.g., mix between physical model and data driven approach), etc.

In some embodiments, the system may receive any number of inputs to the model. Some of these may include, but are not limited to, previous geometries, vessel heading/speed, steering system information (e.g., Monowings forces, on q-fins, etc.), water current measurements, wave measurements (e.g., from Doppler wave radar), non-acoustic measurements, prediction of future sea currents, and/or any combination thereof.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the System and Method for Seismic Streamer control described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method for performing a seismic survey, comprising:
   towing a seismic spread comprising two outer deflectors and two outer streamers in a substantially straight course in a first direction for a predefined distance;
   after completing towing along a first distance, traveling through a turn wherein the deflectors each travel along a predefined curved path for a radial turn of approximately 180 degrees;
   after the turn, traveling along a substantially straight course that is substantially parallel to the first course, and towing in an opposite direction to the first direction; and
   predefining a track for each deflector to travel and, using a control system, automatically adjusting a position of the deflector to maintain the deflector on the predefined track wherein the track of each deflector being separated by a first lateral distance outside of the turn, and being separated by a second lateral distance that is smaller than the first lateral distance when in the turn.

2. The method of claim 1, wherein the predetermined track between the first lateral distance and the second lateral distance of the deflectors is non-linear.

3. The method of claim 1, wherein the predetermined track between the first lateral distance and the second lateral distance of the deflectors is partially tapered.

4. The method of claim 1, wherein a lateral width of said plurality of streamers is a first lateral distance outside of the turn, and is a second lateral distance that is smaller than the first lateral distance when in the turn.

5. The method of claim 4, wherein the track of each of the plurality of streamers is alternated so that one is higher or lower than an adjacent streamer, so as to allow for a tighter grouping of the streamers.

* * * * *